United States Patent [19]

Tsuda

[11] Patent Number: 5,091,932
[45] Date of Patent: Feb. 25, 1992

[54] CIRCUIT SWITCHING SYSTEM

[75] Inventor: Yukio Tsuda, Musashino, Japan

[73] Assignee: Kabushiki Kaisha Toshiba, Kawasaki, Japan

[21] Appl. No.: 472,450

[22] Filed: Jan. 19, 1990

Related U.S. Application Data

[63] Continuation of Ser. No. 137,573, Dec. 24, 1987, abandoned.

[30] Foreign Application Priority Data

Dec. 26, 1986 [JP] Japan .............................. 61-314786

[51] Int. Cl.⁵ ............................... H04M 11/00
[52] U.S. Cl. ............................ 379/100; 379/105; 358/434; 358/439
[58] Field of Search ............ 379/100, 96-98, 379/94, 105, 93; 358/400, 434, 439

[56] References Cited

U.S. PATENT DOCUMENTS

| | | | |
|---|---|---|---|
| 4,584,434 | 4/1986 | Hashimoto | 379/105 |
| 4,658,417 | 4/1987 | Hashimoto | 379/105 |
| 4,660,218 | 4/1987 | Hashimoto | 379/93 |
| 4,663,778 | 5/1987 | Takahashi | 379/100 |
| 4,794,637 | 12/1988 | Hashimoto | 379/100 |
| 4,901,343 | 2/1990 | Yamaguchi | 379/100 |

FOREIGN PATENT DOCUMENTS

| | | | |
|---|---|---|---|
| 0194491 | 9/1986 | European Pat. Off. | 379/93 |
| 2855971 | 7/1980 | Fed. Rep. of Germany | 379/100 |
| 0126364 | 10/1981 | Japan | 379/93 |
| 0006656 | 1/1983 | Japan | 379/102 |
| 0141073 | 8/1983 | Japan | 379/93 |
| 0210751 | 12/1983 | Japan | 379/93 |
| 2166624 | 5/1986 | United Kingdom | 379/100 |

OTHER PUBLICATIONS

Teleconnect, November 1987, Protel's Proswitch, p. 209, 379-393.

Primary Examiner—James L. Dwyer
Assistant Examiner—Wing F. Chan
Attorney, Agent, or Firm—Finnegan, Henderson, Farabow, Garrett, and Dunner

[57] ABSTRACT

A circuit switching system for switching a circuit from a telephone to a facsimile. Circuit switching is performed by a signal, designating circuit switching delivered to the circuit. The circuit is monitored. When a signal designating circuit switching is detected from the circuit, the circuit is switched automatically from the telephone to the facsimile and a starting signal is applied to the facsimile.

6 Claims, 5 Drawing Sheets

CIRCUIT SWITCHING SYSTEM

This application is a continuation of application Ser. No. 07/137,573, filed Dec. 24, 1987, now abandoned.

BACKGROUND OF THE INVENTION

1. Field of the Invention

This invention relates to a circuit switching system which switches a circuit to a facsimile after a telephone receives a call incoming via the circuit.

2. Description of the Prior Art

Conventionally, a structure shown in FIG. 1 is used to allow a telephone and a facsimile to use in common a circuit connected to a PBX (Private Branch Exchange) and/or a button telephone. When circuits $3_1$, $3_2$ and $3_3$ are connected to PBX 1, a circuit changing switch 4 is provided in the circuit $3_3$ to allow same to be connected to either one of PBX 1 and a facsimile 5, the switch 4 is arranged to normally connect PBX 1 and circuit $3_3$. If this system is called up using a telephone number allocated to the circuit $3_3$ in order to transmit an original document to facsimile 5, any one of telephones $2_1$-$2_n$ will be called up via PBX 1. When a responder answers this call by a predetermined one of telephones $2_1$-$2_n$, he will be required to switch the switch 4 to the facsimile. After manual switching, facsimile communication is performed via circuit $3_3$.

This system allows the telephone and facsimile to use the circuit $3_3$ in common, but switching the switch 4 is troublesome and inconvenient.

In an attempt to cope with these problems, a circuit shown in FIG. 2 is proposed in which a special telephone 6 is connected to PBX 1 in addition to telephones $2_1$-$2_n$. A switch 8, which is switched by a signal on a signal line $7_1$ extending from the telephone 6, is disposed between PBX 1 and circuit $3_3$ with facsimile 5 being connected to switch 8. Switch 8 is controlled so as to normally connect the circuit $3_3$ and PBX 1. The facsimile 5 is controlled, started and stopped via a signal line $7_2$ extending from telephone 6. In this system, a call incoming via circuit $3_3$ is transmitted via PBX 1 to the telephone 6. If the call is responded by telephone 6, transmission of an original document to facsimile 5 is requested. When a predetermined operation is performed by pressing buttons at telephone 6, a control signal is delivered to the signal lines $7_1$ and $7_2$, the switch 8 is switched so as to connect the circuit $3_3$ and facsimile 5 and to start facsimile 5. The document transmission side starts facsimile transmission via the circuit $3_3$ after switching has been finished.

Handling this system is not troublesome because the switch 8 is not required to be changed manually. However, the special telephone 6 is required to control switch 8 and facsimile 5. In addition, there is a call incoming at the circuit $3_3$, it is delivered to the telephone 6, so that when the telephone 6 is used by another circuit (for example, $3_1$ or $3_2$), it is impossible to transmit an original document to facsimile 5. In order to avoid this inconvenience, all the telephones $2_1$-$2_n$ could have the same structure as the telephone 6. However, the use of more than a few special telephones would increase the entire cost and the number of signal lines and complicate the structure of the system.

As described above, the use of a switch such as the circuit changing switch 4 shown in FIG. 1 renders manual changing troublesome. The use of a system such as that shown in FIG. 2 not only requires special telephones, but also makes it impossible to transmit information to a facsimile if the special telephone is in use. In order to cope with this inconvenient situation, all the system telephones could be replaced with special telephones such as those mentioned above. However, this would increase the cost of the system and complicate the system due to an increase in the number of control signal lines. This invention derives from the consideration of drawbacks in such conventional circuit switching system.

The object of this invention is to provide a circuit switching system which eliminates troublesome manual switching and allows a telephone and a facsimile to use a circuit in common without relying upon a special telephone.

SUMMARY OF THE INVENTION

According to this invention, a circuit switching system comprises switch means connected to a circuit for switching the circuit selectively to a reception side telephone or facsimile; detection and control means for receiving a signal on the circuit, determining whether the signal designates circuit switching, and driving the switch means to switch the circuit from the reception side telephone to the facsimile and to deliver a starting signal to the facsimile when the signal on the circuit is determined to designate circuit switching.

The reception side telephone may be connected directly to the circuit or may be connected via a PBX or the like to the circuit.

According to this invention, circuit switching is performed automatically by a signal designating a circuit switching, so that troublesome manual switching is avoided. Since this system does not employ a structure in which a telephone itself directly controls the switch, the telephone and facsimile can use the circuit in common even if the telephone is not a special one.

DESCRIPTION OF THE PREFERRED EMBODIMENTS

Figure 1:
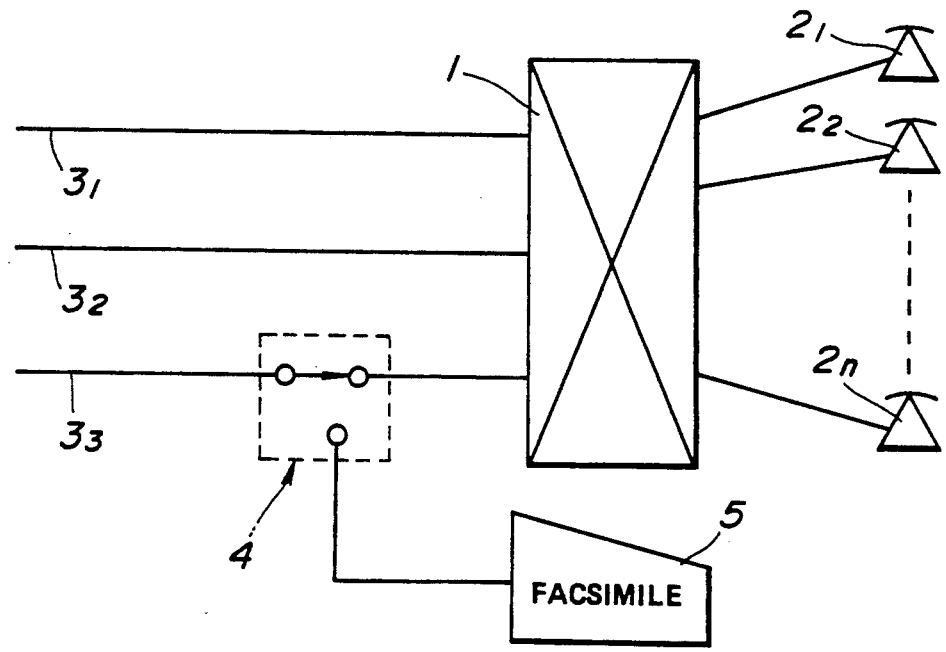
FIGS. 1 and 2 are block diagrams of telephone systems using a conventional circuit switching system.
Figure 2:
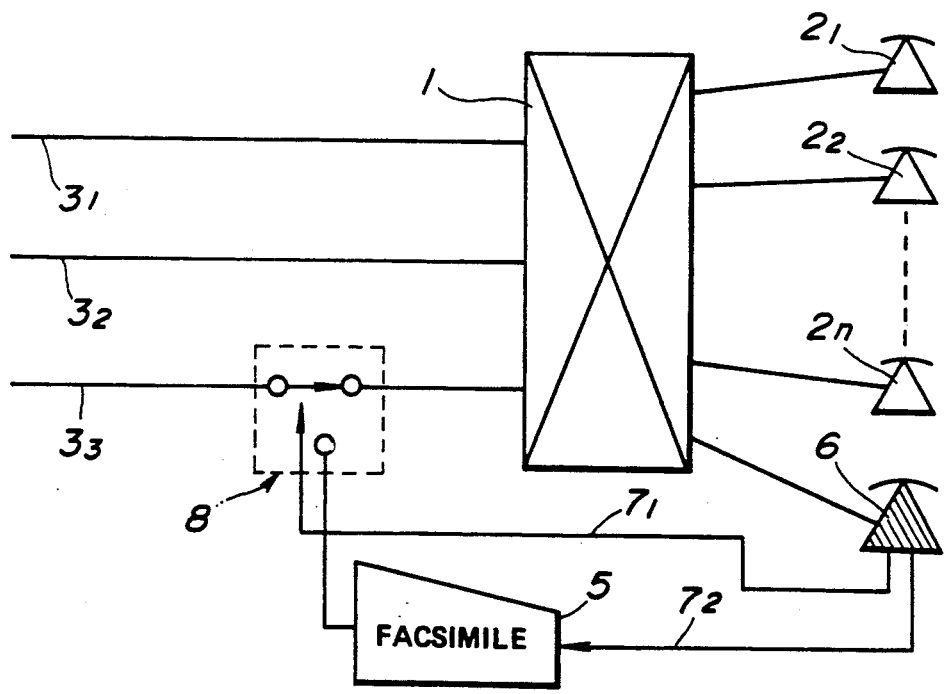
Figure 3:
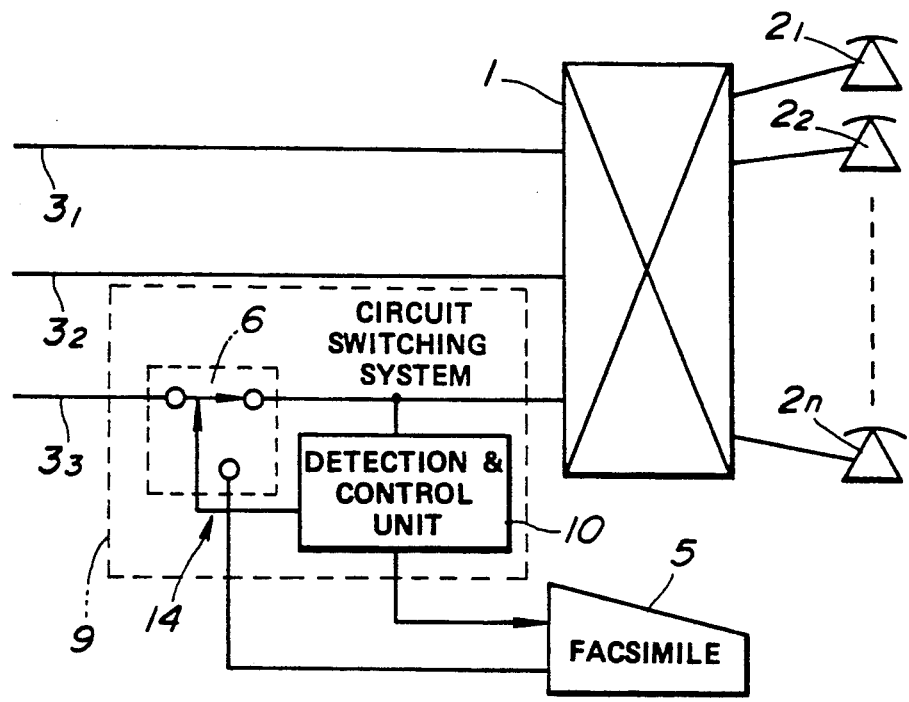
FIG. 3 is a block diagram of a telephone system using one embodiment of this invention.
Figure 4:
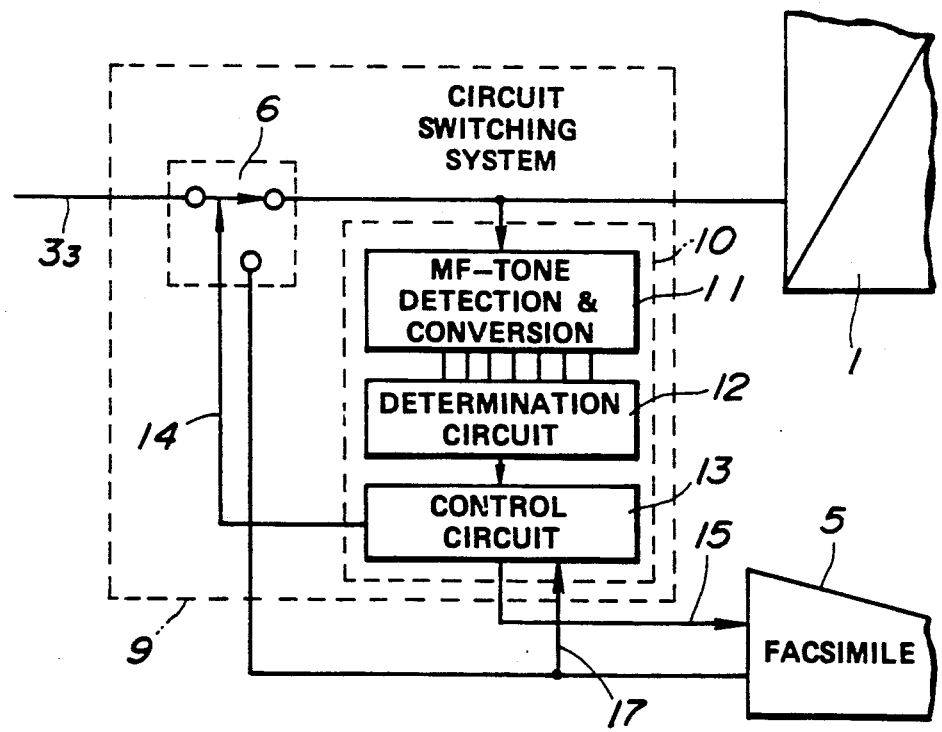
FIG. 4 is a block diagram showing one embodiment of a circuit switching system of this invention.

One embodiment of this invention will now be described with reference to the drawings. FIG. 3 is a block diagram of a telephone system using one embodiment of this invention. FIG. 4 is a block diagram showing in detail one embodiment of this invention. In these Figures, like reference numerals are used to denote like elements in FIGS. 1, 2, 3 and 4 throughout and further description will be omitted. Reference numeral 9 denotes a circuit switching system which includes a switch 6 provided between circuit $3_3$ and PBX 1 to switch the circuit $3_3$ to one of PBX 1 and facsimile 5, and a detection and control unit 10 which controls switching of the switch 6. The unit 10 includes an MF tone detection and conversion circuit 11 which detects and decodes a PB-MF tone (a dual tone multi-frequency signal, hereinafter referred to as the DTMF signal) on the circuit $3_3$, a determination circuit 12 which receives decoded data from the conversion circuit 11 and determines whether the data indicates a circuit changing command, and a control circuit 13 which performs the switching control of the switch 6 and the starting and stopping of the facsimile 5 in accordance with the result detected by the determination circuit 12. The MF tone detection and conversion circuit 11 and determination circuit 12 function as detection means which receives a signal from the circuit $3_3$ and detects whether the signal indicates a circuit switching command. The control circuit 13 functions as control means which, when the detection means detects a circuit switching command, changes the switch 6 so as to connect the circuit $3_3$ to facsimile 5 and to start the facsimile 5.

In the telephone system thus constructed, the control circuit 13 initially controls the switch 6 via a signal line 14 such that, as shown, the circuit $3_3$ and PBX 1 are connected and that the facsimile 5 is placed at its inactive state via a signal line 15. When there is a call incoming via the circuit $3_3$, the call is delivered to any one or more of telephones $2_1-2_n$ via PBX 1. If this call is responded by any one of the telephones, it is possible to talk with a person at the other end of the line. If that person requests facsimile communication, certain buttons of the telephone which has responded to the call are pressed in a predetermined manner (generally, not performed in the usual operation of the dial buttons—for example, the button "#" is pressed successively by a predetermined number of times, the buttons "#" and "*" are pressed alternately by a number of times.). The telephone then transmits the corresponding DTMF signal via PBX 1 to the line $3_3$. This DTMF tone is received by MF tone detection conversion circuit 11 and transmitted as circuit changing command data to the determination circuit 12. When the circuit 12 receives the command data, it produces an active output. When the control circuit 13 receives this output, it controls the switch 6 via the signal line 14 such that the circuit $3_3$ is connected to the facsimile 5 and that the facsimile 5 is started via signal line 15. Thereafter, the facsimile 5 can perform facsimile communication via the circuit $3_3$ with a terminal at the other end of the circuit $3_3$. When the facsimile communication has ended, the control circuit 13 senses "no signal" via a signal line 17 and determines that the communication has ended, controls the switch 6 via the signal line 14 such the circuit $3_3$ is connected to PBX 1 and stops the facsimile 5 via the signal 15.

Figure 5:
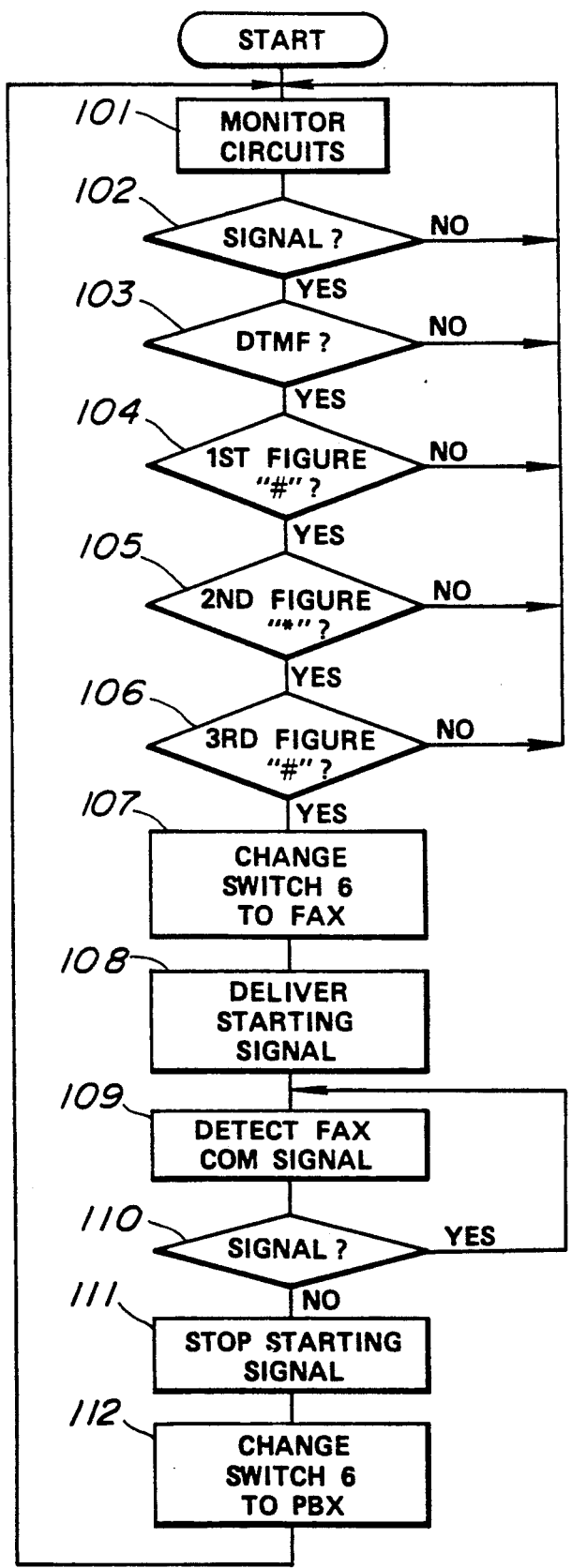
FIG. 5 is a flowchart showing another embodiment of this invention.

While in the above embodiment the detection and control unit 10 has been shown as being composed of MF tone detection and conversion circuit 11, determination circuit 12 and control circuit 13, it may be composed by software. FIG. 5 is a flowchart of one embodiment of the detection and control unit 10 constructed by software.

In this embodiment, it is arranged that a switching command which instructs the circuit switching system 9 to switch the circuit to the facsimile 5 is generated by pressing sequentially the buttons "#", "*", and "#" of the telephone connected to PBX 1.

The detection and control unit 10 monitors a signal on the circuit $3_3$ (step 101). When a signal on the circuit $3_3$ is detected (step 102), a shift is made to step 103 where it is determined whether the detected signal is a DTMF signal. If so, a shift is made to step 104 where it is determined whether the DTMF signal is a signal corresponding to "#", namely, whether the first figure of the signal transmitted to the circuit $3_3$ corresponds to "#". If so, a shift is made to 105 where it is determined whether the second figure of the signal transmitted to the circuit $3_3$ corresponds to "*". If so, a shift is made to step 106 where it is determined whether the third figure corresponds to "#". As just described above, when the signal transmitted to the circuit $3_3$ corresponds to "#", "*" and "#", it is determined to be so at steps 104, 105 and 106 and a shift is made to step 107. If it is determined that there is no signal, it is not DTMF signal, the first figure does not correspond to "#", the second figure does not correspond to "*", and the third figure does not correspond to "#" at steps 102, 103, 104, 105 and 106, respectively, a return is made to step 101.

At step 107 the switch 6 is changed via signal line 14 such that the circuit $3_3$ is connected to the facsimile 5.

Subsequently, a shift is made to step 108 where the facsimile 5 is started via signal line 15. Thereafter, the facsimile 5 can perform facsimile communication with the terminal at the other end of the circuit $3_3$ via this circuit.

If a starting signal is delivered at step 108, a shift is made to step 109 where the facsimile communication signal is sensed via a signal line 17. If it is determined that there is a signal at step 110, a return is made to step 109 where this operation is repeated.

When the facsimile communication ends and the facsimile communication signal on the signal line 17 disappears, it is determined that there is no signal at step 101 and a shift is made to step 111.

At step 111 the starting signal applied to the facsimile 5 via the signal line 15 is stopped. Subsequently a shift is made to step 112 where the switch 6 is controlled via the signal line 14 to switch the circuit $3_3$ to PBX 1, and then a return is made to step 101.

Figure 6:
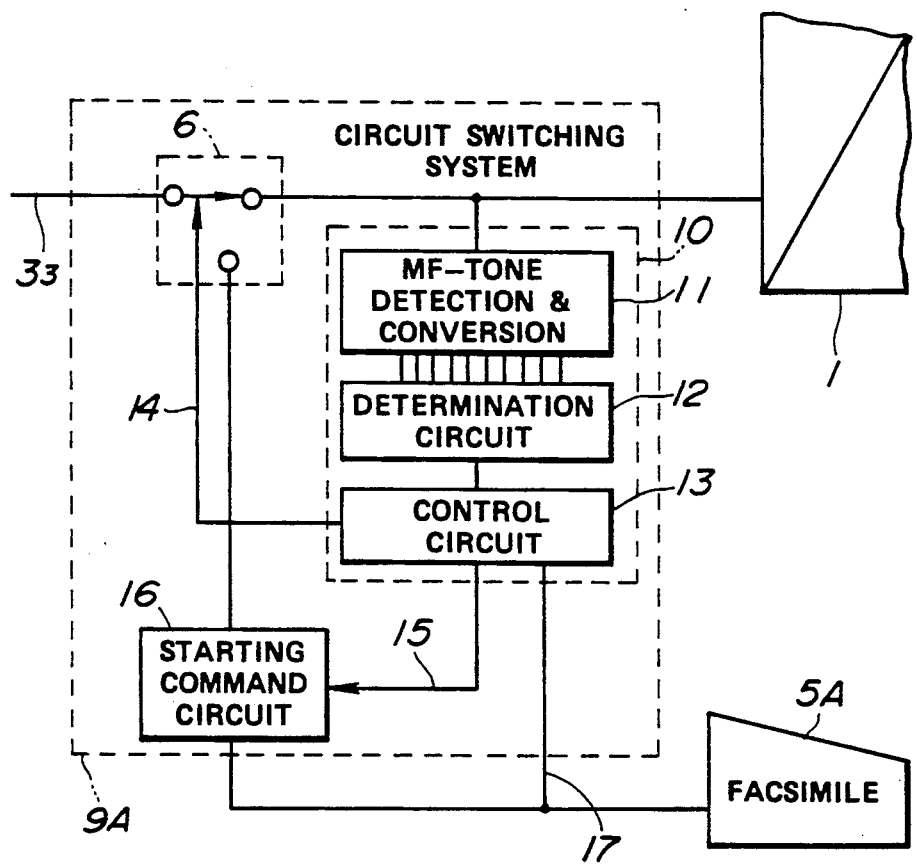
FIG. 6 is a block diagram showing a further embodiment of this invention.
Figure 7:
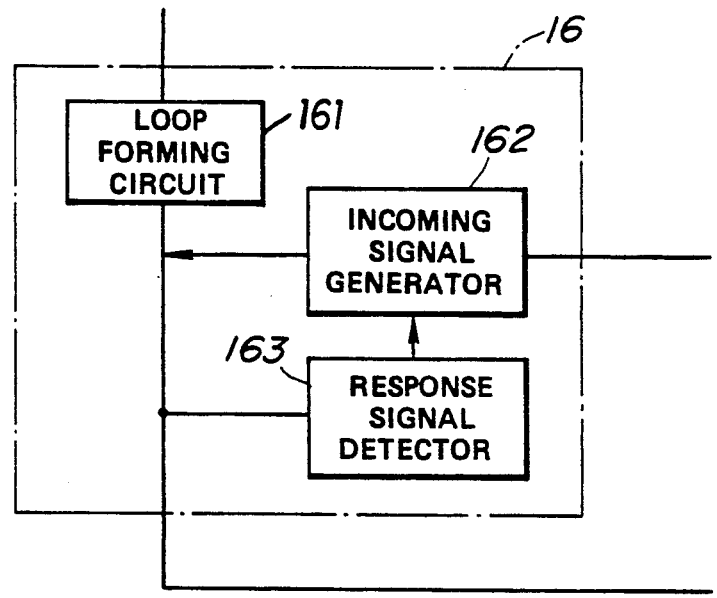
FIG. 7 is a block diagram showing the details of a starting indication circuit of the further embodiment.

FIG. 6 shows another embodiment of this invention. In this embodiment, a starting command circuit 16 is provided which is started via the signal line 15 by the control circuit 13. As shown in FIG. 7, the circuit 16 includes a loop forming circuit 161, an incoming signal generator 162, a response signal detector 163. When the starting command circuit 16 receives a command from control circuit 13, it drives the incoming signal generator to cause a 16 Hz incoming signal to be delivered to the facsimile 5A. When the facsimile 5A responds to this signal, this fact is sensed by the response signal detector 163 to stop the transmission of the 16 Hz incoming signal from the incoming signal generator 162 and to drive the loop forming circuit 161 such that a signal can pass between the facsimile 5A and the switch 6. Other structural portions are similar to the corresponding ones of the circuit switching system 9 of FIG. 4. According t such structure, the facsimile 5A can be constructed such that it operates in response to a usual incoming signal in an automatic reception mode without relying on a starting signal.

Figure 8:
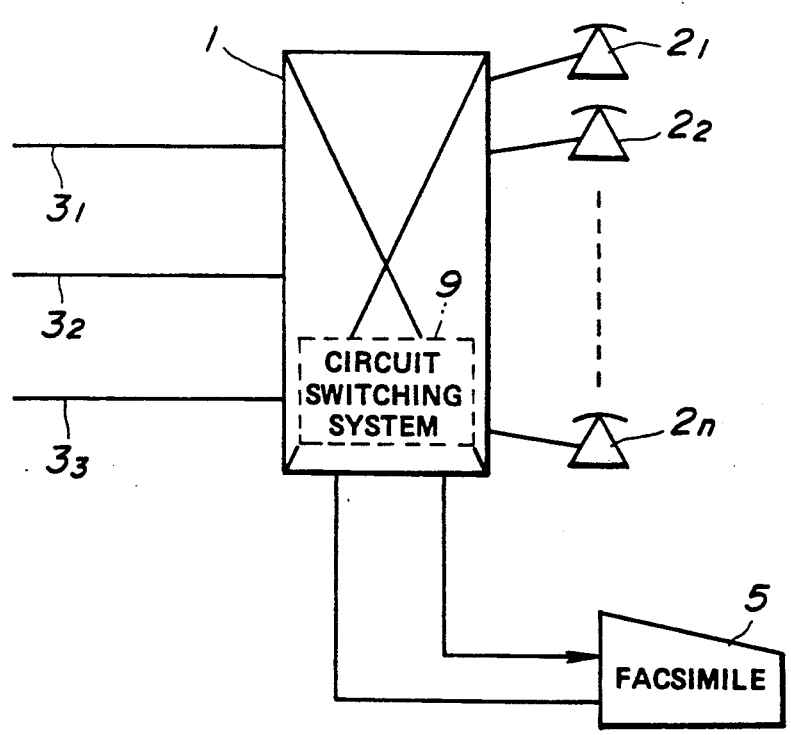
FIG. 8 is a block diagram of a telephone system in which a circuit switching system is provided in a PBX.

While in the above embodiment the DTMF signal is shown as being transmitted from the telephones $2_1-2_n$ of PBX 1, it may be transmitted from the terminal at the other end of the circuit. A command for circuit switching may be indicated by a signal other than DTMF signal. The circuit switching systems 9 and 9A may be built in the PBX, as shown in FIG. 8.

What is claimed is:

1. A circuit switching system comprising:
an exchange for accommodating a plurality of extension telephone sets, the exchange being connected to a plurality of circuits;
circuit switching means provided in one of the plurality of circuits;
a facsimile connectable to the plurality of extension telephone sets via the circuit switching means, the facsimile being commonly used by the plurality of extension telephone sets;
means for outputting a facsimile switching signal to the one of the plurality of circuits through a key operation of one of the plurality of extension telephone sets;
means for detecting the facsimile switching signal and outputting a detection output signal, the facsimile switching signal detecting means being connected to the one of the plurality of circuits; and
control means for driving the circuit switching means in response to the detection output signal of the facsimile switching signal detecting means to connect the one of the plurality of circuits to the facsimile.

2. The circuit switching system according to claim 1, wherein the facsimile switching signal comprises a DTMF signal.

3. The circuit switching system according to claim 2, wherein the detecting means comprises means for detecting the DTMF signal, and means for analyzing the DTMF signal detected by the DTMF signals detecting means.

4. The circuit switching system according to claim 1, wherein the control means comprises:
means for generating a start signal for starting the facsimile in response to the detection signal of the facsimile switching signal detecting means;
means for generating an incoming signal in response to the start signal generated by the starting signal generating means; and
means for outputting the incoming signal generated in the incoming signal generating means to the facsimile.

5. The circuit switching system according to claim 4, wherein the control means further comprises means for detecting a response signal from the facsimile to stop the incoming signal outputted from the incoming signal outputting means and means for generating a direct current loop between the facsimile and the circuit switching means.

6. The circuit switching system according to claim 1, wherein the circuit switching means, the facsimile switching signal detecting means and the control means are disposed within the exchange.

* * * * *